(12) United States Patent
Pagot

(10) Patent No.: US 7,584,744 B2
(45) Date of Patent: Sep. 8, 2009

(54) INTERNAL-COMBUSTION AND BURNT GAS SCAVENGING SUPERCHARGED ENGINE WITH AT LEAST TWO INTAKE MEANS

(75) Inventor: Alexandre Pagot, Rueil Malmaison (FR)

(73) Assignee: Institut Francais du Patrole, Rueil Malmaison Cedex (FR)

( * ) Notice: Subject to any disclaimer, the term of this patent is extended or adjusted under 35 U.S.C. 154(b) by 0 days.

(21) Appl. No.: 11/946,176

(22) Filed: Nov. 28, 2007

(65) Prior Publication Data

US 2008/0135027 A1 Jun. 12, 2008

(30) Foreign Application Priority Data

Nov. 30, 2006 (FR) .................................. 06 10550

(51) Int. Cl.
*F02M 61/14* (2006.01)
(52) U.S. Cl. ..................... 123/432; 123/470; 123/472
(58) Field of Classification Search ................. 123/308, 123/432, 470
See application file for complete search history.

(56) References Cited

U.S. PATENT DOCUMENTS

| | | | | | |
|---|---|---|---|---|---|
| 4,719,886 | A | * | 1/1988 | Kotani et al. ................ | 123/308 |
| 4,770,139 | A | * | 9/1988 | Tanaka ......................... | 123/308 |
| 4,805,569 | A | * | 2/1989 | Suzumura et al. ........... | 123/308 |
| 5,094,212 | A | * | 3/1992 | Kawaguchi et al. ......... | 123/470 |
| 5,150,691 | A | * | 9/1992 | Imajo .......................... | 123/531 |
| 5,167,211 | A | * | 12/1992 | Fukuma et al. ............. | 123/308 |
| 5,553,580 | A | * | 9/1996 | Ganoung .................... | 123/308 |
| 5,829,408 | A | * | 11/1998 | Yamaguchi et al. ......... | 123/308 |
| 5,887,799 | A | * | 3/1999 | Smith ...................... | 239/585.1 |
| 6,782,872 | B2 | * | 8/2004 | Moschini et al. ............ | 123/470 |

FOREIGN PATENT DOCUMENTS

| | | |
|---|---|---|
| DE | 195 35 047 A1 | 3/1997 |
| EP | 1 726 805 A1 | 11/2006 |
| FR | 2 720 113 | 11/1995 |
| FR | 2 720 114 | 11/1995 |
| JP | 59-043922 | 3/1984 |

OTHER PUBLICATIONS

French Search Report, FR 0610550, Jul. 6, 2007.

* cited by examiner

*Primary Examiner*—Erick Solis
(74) *Attorney, Agent, or Firm*—Antonelli, Terry, Stout & Kraus, LLP.

(57) ABSTRACT

The present invention relates to an indirect-injection internal-combustion engine, notably a supercharged engine, in particular of spark-ignition type, that can run according to a burnt gas scavenging mode or to a conventional mode, comprising at least one cylinder (10) with a combustion chamber (12), at least two air intake means (14, 16), one (14) of the means being a burnt gas scavenging intake means and the other (16) being a fuel injection intake means. The means comprising each a pipe (18, 20) controlled by an intake valve (22, 24), at least one burnt gas exhaust means with an exhaust valve (34) associated with an exhaust pipe (36) and at least one fuel injection means (26). According to the invention, the fuel injection means comprises an injector (26) with two nozzles (28, 30) allowing, when the engine runs in scavenging mode, the injection intake means (16) to be supplied with fuel through one (30) of the nozzles only and, when the engine runs under conventional conditions, scavenging intake means (14) and injection intake means (16) are respectively supplied with fuel through nozzles (28, 30).

8 Claims, 1 Drawing Sheet

INTERNAL-COMBUSTION AND BURNT GAS SCAVENGING SUPERCHARGED ENGINE WITH AT LEAST TWO INTAKE MEANS

BACKGROUND OF THE INVENTION

1. Field of the Invention

The present invention relates to an internal-combustion and burnt gas scavenging supercharged engine with at least two intake means.

It more particularly relates to an indirect fuel injection type engine, notably a spark-ignition engine.

2. Description of the Prior Art

In this type of engine, the power delivered by an internal-combustion engine depends on the amount of air fed into the combustion chamber. This amount of air can therefore be increased by compression of the air before it is fed into this combustion chamber to meet the power requirement. Air supercharging can be obtained by any means such as a turbo-supercharger or a driven compressor such as a screw compressor.

As it is well known, scavenging the residual burnt gas present in the combustion chamber allows the amount of air fed into the cylinder to be increased even further by discharging this gas, during the engine intake phase, and replacing it by supercharged air.

As described in detail in French Patent 2,886,342, the scavenging stage is carrying out at the end of the engine exhaust cycle and at the start of the intake cycle, by overlapping of the exhaust and intake valves of a cylinder. This overlap is obtained by opening simultaneously these exhaust and intake valves for a few degrees to some ten degrees of crankshaft rotation.

In the indirect fuel injection supercharged engine example described in French Patent 2,886,342, at least one burnt gas exhaust means is provided with an exhaust valve, as well as an exhaust pipe and at least two supercharged air intake means each having a pipe carrying a fuel injector and a valve.

Burnt gas scavenging is carried out by overlap of the exhaust valve and of one of the supercharged air intake valves, while the other supercharged air intake valve remains closed and further, by the pressure of the air at the open intake valve being higher than the pressure of the exhaust gas still present in the combustion chamber.

The supercharged air that flows into the combustion chamber is a non-carbureted supercharged air since the fuel injector is not actuated. This non-carbureted air scavenges the exhaust gas present in this chamber and discharges it through the exhaust valve. Non-carbureted supercharged air therefore occupies the volume which has been swept clean of exhaust gas, which allows a significant increase in the amount of air introduced during the engine intake cycle. Near the end of the scavenging stage, the exhaust valve closes, the other supercharged air intake valve opens, the fuel injector associated with this valve is activated and carbureted supercharged air is fed into the combustion chamber through the other intake means as a complement to the non-carbureted supercharged air that is allowed therein.

When the engine runs under conventional conditions, without a scavenging phase, both intake valves open, both injectors are actuated and carbureted supercharged air is fed into the combustion chamber simultaneously through both intake pipes.

Although this type of engine runs satisfactorily, it however involves the significant drawback of requiring the presence of two fuel injectors per cylinder. Besides the cost of these injectors, it is absolutely necessary to double not only the fuel supply, but also the connections of the injectors for each cylinder and control means associated with these injectors. This increases all the more failure and malfunction risks.

The present invention overcomes the aforementioned drawbacks by means of an engine with simple and inexpensive intake means.

SUMMARY OF THE INVENTION

The present invention thus relates to an indirect-injection internal-combustion engine, notably supercharged, in particular a spark-ignition engine, that can run according to a burnt gas scavenging mode or to a conventional mode. at the invention comprises at least one cylinder with a combustion chamber, at least two air intake means, one of the means being a burnt gas scavenging intake means and the other a fuel injection intake means, the intake means each comprising a pipe controlled by an intake valve, at least one burnt gas exhaust means with an exhaust valve associated with an exhaust pipe and at least one fuel injection means, wherein the fuel injection means comprises an injector with two nozzles permitting, when the engine runs in a scavenging mode, the injection intake means to be supplied with fuel only through one of the nozzles and, when the engine runs under conventional conditions, the scavenging and injection intake means to be supplied with fuel through both nozzles.

The injector advantageously comprises switch means for supplying the nozzles.

The internal-combustion engine preferably comprises a calculator controlling the injection parameters of the injector.

BRIEF DESCRIPTION OF THE FIGURES

Other features and advantages of the invention will be clear from reading the description given hereafter by way of non limitative example, with reference to the accompanying figures wherein.

DETAILED DESCRIPTION

Figure 1:
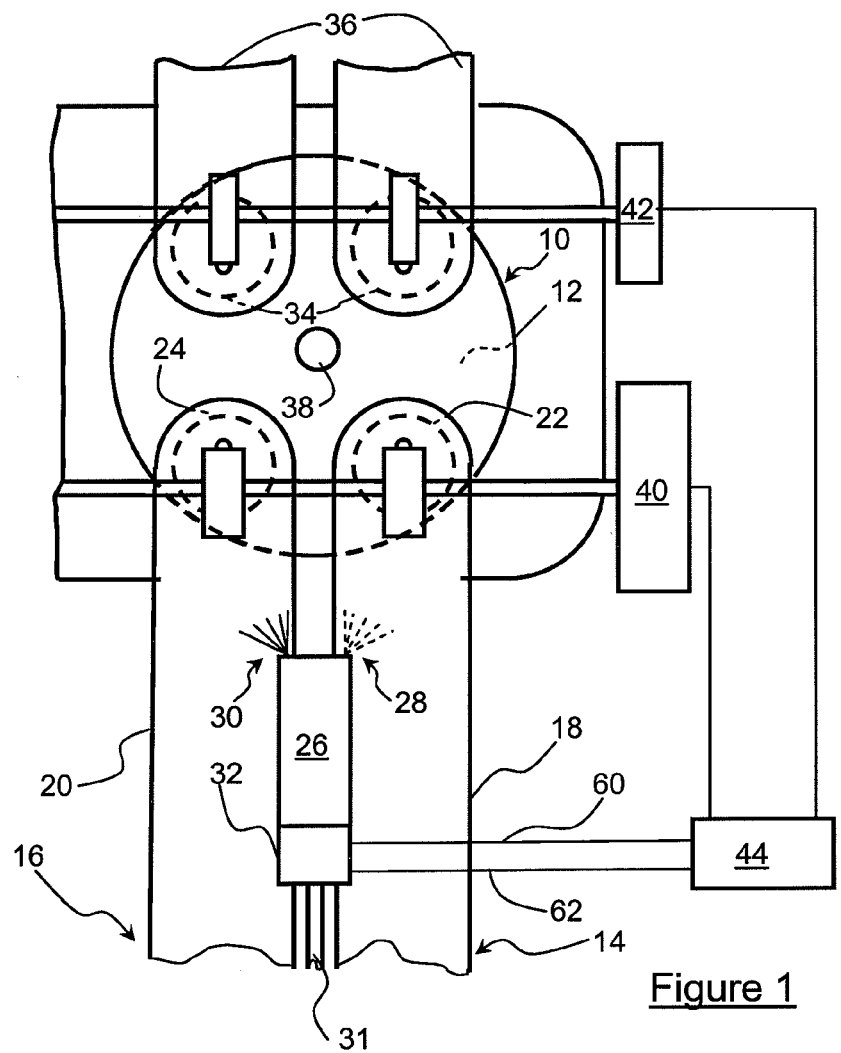
FIG. 1 is a diagrammatic view of an internal-combustion engine according to the invention.

FIG. 1 shows a supercharged internal-combustion engine, notably of indirect fuel injection type (gasoline, LPG, CNG, . . . ), in particular a spark-ignition engine.

This engine comprises at least one cylinder 10 with a piston (not shown) and a combustion chamber 12 in which combustion of a fuel mixture such as a mixture of supercharged air and of fuel, or of supercharged air to which recirculated exhaust gas (EGR) has been added and of fuel occurs.

Cylinder 10 comprises at least two air intake means 14 and 16, which, are used, during the burnt gas scavenging phase with one of them 14 functioning as scavenging intake means and the other of the functioning 16 as injection intake means. Scavenging intake means 14 allow the combustion chamber to be supplied with a non-carbureted supercharged air for the scavenging phase or with a carbureted supercharged air for conventional engine running conditions. Injection intake means 16 allow the chamber 12 to be supplied with a carbureted supercharged air when the engine runs under burnt gas scavenging conditions as well as under conventional conditions.

Usually, these intake means have an orifice, provided in the cylinder head of the engine, which opens into combustion chamber 12, pipes 18 and 20 communicating with this orifice and intake valves 22 and 24 for shutting off the orifice. The two pipes are preferably designed so as to be substantially parallel to one another while being connected to an air supply means such as an intake manifold(not shown).

A fuel injector 26 with a double nozzle 28, 30 (or double jet) is placed on pipes 18 and 20 in such a way that it allows delivery of a fuel jet into these pipes according to the engine running mode. This injector is fed by a single fuel supply line 31 with the fuel distribution among the nozzles being provided by a switch means 32.

Cylinder 10 also comprises at least one burnt gas exhaust means here two Exhaust means, 36 being present which each include an exhaust valve 34 and an exhaust pipe 36.

The engine can also comprise a spark plug 38 for initiating combustion of the fuel mixture contained in combustion chamber 12.

The scavenging intake 22 and injection intake 24 valves, as well as exhaust valves 34, are controlled by means 40 and 42 for varying the lift laws of these valves, at their opening/closing times as well as at their lift times, independently of one another or in a combined manner. These means are more commonly known as VVT (Variable Valve Timing) or VVA (Variable Valve Actuation).

Control means 40 and 42 are controlled by the engine calculator 44 of the type any engine is usually equipped with. The engine calculator 42 comprises mappings or charts allowing modification, depending on the running conditions of the engine, the valve lift laws and the control of the injection parameters of injector 26, such as selective fuel delivery to the nozzles, injection time, etc.

Figure 2:
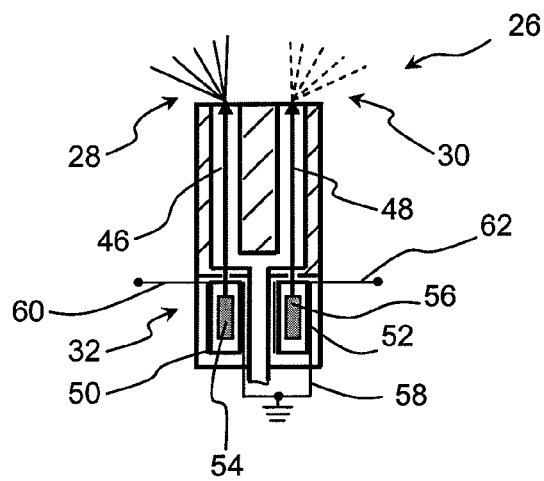
FIG. 2 is a detail diagrammatic view of an element of the engine according to FIG.1.

In connection with FIG. 2, injector 26 comprises two nozzles 28 and 30 each controlled by a needle 46 and 48 whose displacement is controlled by switch means 32. Advantageously, this switch means comprises, for each needle, an electromagnetic coil 50 and 52 with a plunger 54 and 56 connected respectively to needles 46 and 48 respectively. Coils 50 and 52 are connected to one another by a grounded electric conductor 58. Each coil comprises a conductive wire 60 and 62 connected to the engine calculator 44.

It is therefore possible to control not only the nozzles independently of one another, but also to vary the injection parameters of one of the nozzles in relation to the other.

When the engine runs according to the supercharged air intake mode with burnt gas scavenging, engine calculator 44 triggers a burnt gas scavenging phase. This engine calculator therefore controls control means 40 and 42 so as to achieve overlapping of the valves. In this stage, the piston is in the vicinity of the top dead center, exhaust valves 34 are open, intake valve 24 of injection intake means 16 is in closed position, intake valve 22 of scavenging intake means 14 is in open position and injector 26 is not operational, that is nozzles 38 and 40 are shut off by needles 46 and 48.

Under the effect of the pressure differential between the pressure of the non-carbureted supercharged air at valve 22 and the pressure of the residual burnt gas present in chamber 12, the exhaust gas is discharged through exhaust valves 34 to exhaust pipes 36 and replaced by fuel-free supercharged air.

As soon as the burnt gas scavenging phase is complete, closing of exhaust valves 34 is controlled by control means 42, scavenging intake valve 22 remains open and opening of injection intake valve 24 is controlled by control means 40. The engine calculator then controls coil 50 through wire 60 so as to move plunger 54 under the effect of the electromagnetic field generated by this coil, which releases nozzle 28 while injecting fuel only into pipe 20. A fuel mixture is thus fed into combustion chamber 12.

In case of the engine running conventionally with an intake mode without burnt gas scavenging, intake valves 22 and 24 and exhaust valves 34 are controlled conventionally. Thus, near piston top dead center, exhaust valves 34 are in closed position, and scavenging intake valve 22 as well as injection intake valve 24 are open. The engine calculator activates the injector in such a way that the two coils 50 and 52 are supplied by wires 60 and 62 by moving needles 46 and 48 to allow nozzles 28 and 30 to be supplied with fuel by injecting fuel into pipes 18 and 20 respectively. This allows a fuel mixture to be fed into the combustion chamber through each one of the pipes.

In accordance with the invention, a single injector provides injection of fuel into either the injection intake pipe or into both intake pipes, in a simple, reliable and economical way.

The present invention is not limited to the example described and it encompasses any variant or equivalent.

The invention claimed is :

1. An indirect injection internal combustion engine which is supercharged and has spark-ignition which is operational in a burnt gas scavenging mode or in a conventional mode, comprising at least one cylinder with a combustion chamber, at least two air intake means, one of the at least two air intake means being a burnt gas scavenging intake means and the other of the at least two air intake means being a fuel injection intake means, the at least two air intake means each comprising a pipe controlled by an intake valve, at least one burnt gas exhaust means with an exhaust valve associated with an exhaust pipe and at least one fuel injection means, wherein the fuel injection means comprises an injector with two nozzles allowing, when the engine runs in the gas scavenging mode, injection intake means are supplied with fuel only through one of the nozzles and, when the engine runs conventionally, the scavenging intake means and injection intake means are supplied respectively with fuel through the nozzles and the gas scavenging mode occurs when overlap of an exhaust valve and an intake valve occurs.

2. An internal-combustion engine as claimed in claim 1, wherein the injector comprises switch means for supplying fuel to the nozzles.

3. An internal-combustion engine as claimed in claim 1, comprising a calculator controlling injection parameters of the injector.

4. An internal-combustion engine as claimed in claim 2, comprising a calculator controlling injection parameters of the injector.

5. A internal-combustion engine as claimed in claim 1 wherein during the burnt gas scavenging mode prior to fuel being supplied through on of the nozzles, no fuel is supplied through the two nozzles.

6. An internal-combustion engine as claimed in claim 2 wherein during the burnt gas scavenging mode prior to fuel being supplied through one of the nozzles, no fuel is supplied through the nozzles.

7. An internal-combustion engine as claimed in claim 3 wherein during the burnt gas scavenging mode prior to fuel being supplied through one of the nozzles, no fuel is supplied through the two nozzles.

8. An internal-combustion engine as claimed in claim 4 wherein during the burnt gas scavenging mode prior to fuel being supplied through one of the nozzles, no fuel is supplied through the two nozzles.

* * * * *